US005738766A

United States Patent [19]

Jefferson

[11] Patent Number: 5,738,766
[45] Date of Patent: Apr. 14, 1998

[54] DEVICE FOR NEUTRALIZING AND PREVENTING FORMATION OF SCALE AND METHOD

[75] Inventor: George Nathan Jefferson, Gettysburg, Pa.

[73] Assignee: Nathan Jefferson Enterprises, Inc., Gettysburg, Pa.

[21] Appl. No.: 649,173

[22] Filed: May 17, 1996

[51] Int. Cl.$^6$ .......................................... C02F 1/46
[52] U.S. Cl. ........................... 204/155; 210/94; 210/96.1; 210/97; 210/143; 210/222; 210/243; 204/554
[58] Field of Search .................................. 204/155, 554; 210/94, 96.1, 97, 143, 222, 243

[56] References Cited

U.S. PATENT DOCUMENTS

| | | | |
|---|---|---|---|
| 4,326,954 | 4/1982 | Shroyer | 210/222 |
| 4,938,875 | 7/1990 | Niessen | 210/695 |
| 4,999,106 | 3/1991 | Schindler | 210/222 |
| 5,024,759 | 6/1991 | McGrath et al. | 210/222 |
| 5,051,177 | 9/1991 | Dauchez | 210/222 |
| 5,074,998 | 12/1991 | De Baat Doelman | 210/97 |
| 5,118,416 | 6/1992 | Janczak et al. | 210/222 |
| 5,171,431 | 12/1992 | Schutle | 210/94 |
| 5,200,071 | 4/1993 | Spiegel | 210/222 |
| 5,238,558 | 8/1993 | Curtis | 210/222 |
| 5,238,577 | 8/1993 | Newsom | 210/695 |
| 5,269,915 | 12/1993 | Clair | 210/222 |
| 5,271,834 | 12/1993 | Mondiny | 210/222 |
| 5,304,302 | 4/1994 | Bossert | 210/222 |
| 5,356,534 | 10/1994 | Zimmerman et al. | 210/222 |
| 5,364,536 | 11/1994 | Mercier | 210/695 |
| 5,366,623 | 11/1994 | Clair | 210/222 |
| 5,366,630 | 11/1994 | Chevallet | 210/645 |
| 5,368,705 | 11/1994 | Cassidy | 204/136 |
| 5,374,351 | 12/1994 | Bolton et al. | 210/97 |
| 5,378,362 | 1/1995 | Schoepe | 210/222 |
| 5,380,430 | 1/1995 | Overton et al. | 210/222 |
| 5,393,421 | 2/1995 | Ohe et al. | 210/223 |
| 5,411,143 | 5/1995 | Greene | 210/222 |
| 5,453,188 | 9/1995 | Florescu et al. | 210/222 |
| 5,454,943 | 10/1995 | Ashton et al. | 210/222 |
| 5,460,702 | 10/1995 | Birkbeck et al. | 204/149 |
| 5,460,718 | 10/1995 | Weck et al. | 210/205 |
| 5,468,378 | 11/1995 | de la Torre Barreiro | 210/192 |
| 5,470,466 | 11/1995 | Schaaf | 210/222 |
| 5,480,557 | 1/1996 | Kawasaki et al. | 210/695 |

OTHER PUBLICATIONS

Genesis International Trading Ltd., "The Principles of Scale Formation and Prevention", (no date provided).
Scale Watcher, Sales brochure, pp. 1–4, (no date provided).
Scale Watcher "Scale Watcher Industrial", 1976, pp. 1–4, (no month).
Genesis International Trading Ltd., "Electronic Scale Elimination Technology", pp. 1–4, (no date provided).

*Primary Examiner*—Arun S. Phasge
*Attorney, Agent, or Firm*—Thomas Hooker, P.C.

[57] ABSTRACT

A descaling device for neutralizing and preventing formation of calcium carbonate or other scale in a water conduit includes an electromagnetic coil adjacent the conduit and a power supply for the coil. The power supply generates a complex triangular waveform output signal that varies continuously in frequency and amplitude. The output is applied across the ends of the coil creating time varying magnetic and electric fields. The fields physically interact with molecules in water flowing in the conduit to neutralize existing scale and prevent formation of new scale.

18 Claims, 5 Drawing Sheets

DEVICE FOR NEUTRALIZING AND PREVENTING FORMATION OF SCALE AND METHOD

FIELD OF THE INVENTION

The invention relates to a device and method for neutralizing and preventing formation of calcium-hydrogen carbonate scale in water flowing through a conduit.

DESCRIPTION OF THE PRIOR ART

It is common for water carrying conduits to become clogged by calcium-hydrogen carbonate scale adhering to the inner wall of the conduit. The clogging causes a reduction in the flow rate and requires increased pressure to maintain the water flow. The loss in efficiency increases the cost associated with operating systems using water conduits.

Several chemical approaches have been offered to prevent scaling in water systems. One approach uses an ion exchanging mechanism to create neutral molecules that will not adhere to the insides of the conduits. This approach works by adding sodium chloride (NaCl) to the water system. The sodium chloride chemically interacts with the calcium-hydrogen carbonate scale and forms neutral molecules that are carried in solution until they can be flushed out at a later point.

Another approach uses a chemical to prevent calcium-hydrogen carbonate crystals from forming in the water. This approach functions by adding phosphates to the water. The phosphates interact with the molecules in the water to create an environment where calcium-hydrogen carbonate formation is prevented.

Further approaches use electromagnetic fields to interact with the calcium and bicarbonate molecules in the water. The electromagnetic fields agitate ionized calcium and bicarbonate molecules and cause the formulation of neutral calcium carbonate molecules that do not precipitate as scale on the conduits. As the ionized calcium and biocarbonate molecules travel through a changing electromagnetic field, the charges on the molecules interact with the field and move the molecules toward alignment with the field. Alternating or switching directions of the field rotates the molecules toward alignment with the changing field. This rotation for alignment agitates the molecules and breaks the bonds between the molecules and bonded water molecules. With these bonds broken, the calcium and biocarbonate molecules are free to bond together to form a crystal which does not form scale. Conventional of electromagnetic fields used to prevent scale are generated by aligned permanent magnets or electromagnetic coils.

The use of permanent magnets creates electromagnetic fields that have a set strength and direction. The ions move through the constant field and are agitated by change in direction of the field at different locations. Electromagnets create pulsating electromagnetic fields. These fields treat the water during the change in direction and strength of the fields applied as the water flows through the field.

These methods have significant drawbacks. In order to treat the water chemically, direct access to the water is required. Depending on the system to be treated, direct access is not always easy or feasible. Addition of chemicals can also limit the use of the water being treated. It is generally recognized that treatment of drinking water with chemicals is not desirable. The addition of chemicals treats a certain volume of water. In order to treat water that is added later, more chemicals must be added to the system. This is expensive and time consuming. Once added, chemicals are not easily removed.

The devices that use permanent magnets can only treat the water with limited effectiveness because the electromagnetic fields have set directions and the water is only treated when it moves through the field. The prior art electromagnetic devices only treat the water during the change in direction and strength of the fields and are not efficient in treating different size molecules likely to form scale.

SUMMARY OF THE INVENTION

The invention is a descaling device and method useful on water conduit systems to neutralize and prevent the formation of scales. The device includes an electromagnetic coil adjacent the water conduit and a specialized power supply for the coil.

The power supply produces a triangular wave current signal having variable amplitude and frequency. This signal is applied to the ends of the coil to energize the coil and form a corresponding variable electromagnetic field in the water flowing in the conduit. The field varies with changes in frequency and amplitude of the power signal. The field changes strength in response to changes in the signal amplitude and changes direction in response direction change of the current flow. The interaction of the fields with the water provides an effective method of treating the water to neutralize and prevent formation of calcium-hydrogen carbonate scales.

Once installed, the device continuously treats the water flowing past the coil without the need for additional parts or attention. The device has a long useful life.

The field generated by a variable frequency and amplitude triangular wave current signal changes direction and strength at varying rates. This field effectively agitates different size molecules likely to form scale to break bonds between the molecules and water and prevent scale formation. The variations in field strength increase the effectiveness in treating different size molecules. The use of a triangular wave input current signal agitates ionized molecules continuously with a field direction reversal once each cycle.

Other objects and features of the invention will become apparent as the description proceeds, especially when taken in conjunction with the accompanying drawings illustrating the invention, of which there are four sheets and one embodiment.

DESCRIPTION OF THE PREFERRED EMBODIMENT

Figure 1:
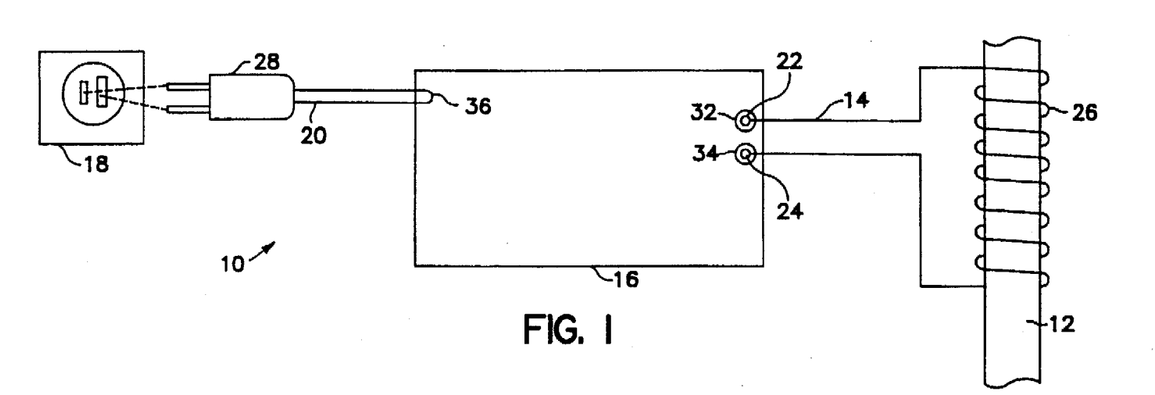
FIG. 1 is a view of the device according to the invention with a coil surrounding a water conduit.

As illustrated in FIG. 1, descaling device 10 for neutralizing and preventing formation of scale in water flowing through a conduit 12 includes an electromagnetic coil 14 surrounding water conduit 12, a power supply 16 having output terminals connected to the ends of coil 14, a source of electrical power 18, which can be a conventional 120 VAC source, and a power cord 20 connected between source 18 and power supply 16. Coil 14 includes two male connectors 22 and 24 each connected to an end of coil 14 and a plurality of helical loops 26 surrounding conduit 12. Plug 28 on cord 20 engages source 18.

Power supply 16 includes a circuit 30, two female output connectors 32 and 34 and a cord connector 36. Male connectors 22 and 24 are inserted in to female connectors 32 and respectively.

Figure 3:
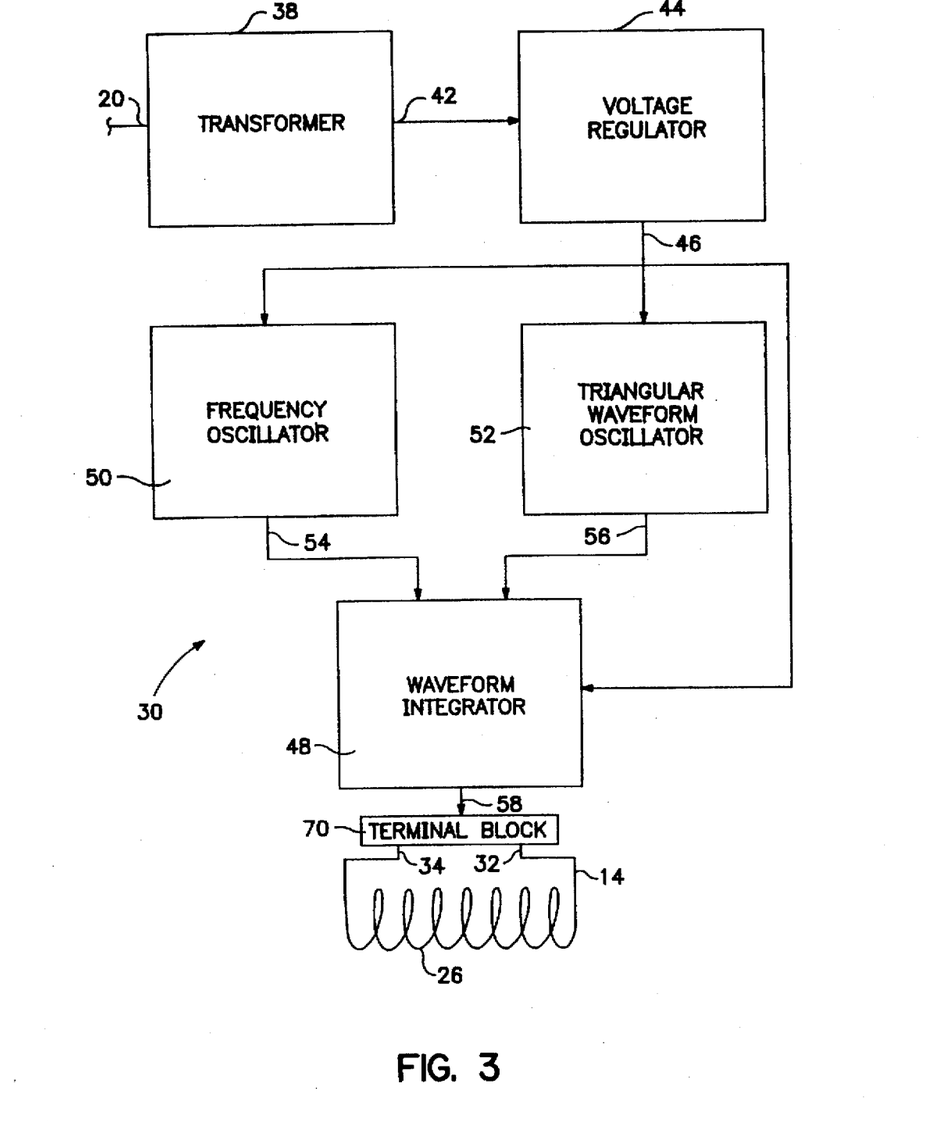
FIG. 3 is a block circuit diagram of the power supply for the device.

The power supply circuit 30 includes a transformer 38 connected to the cord 20 and receives 120 volt sinusoidal voltage signal from source 18. Transformer 38 transforms the voltage signal to a 12 volt sinusoidal output signal at output 42 which is connected to voltage regulator 44. Regulator 44 rectifies signal 42 to form a 12 volt DC regulated signal at output 46 which is connected to waveform integrator 48, frequency oscillator 50 and a triangular waveform oscillator 52.

Frequency oscillator 50 generates frequency output signals 60 and 61 at output 54. Waveform oscillator 52 generates amplitude output signals 62 and 63 at output 56. Integrator 48 integrates signals 60, 61, 62 and 63 to generate a current signal 64 at output 58.

Circuit 30 also includes a terminal block 70 connected between integrator 48 and coil female connectors 32 and 34. Terminal block 70 applies circuit output signal 64 to coil 14.

Figure 4:
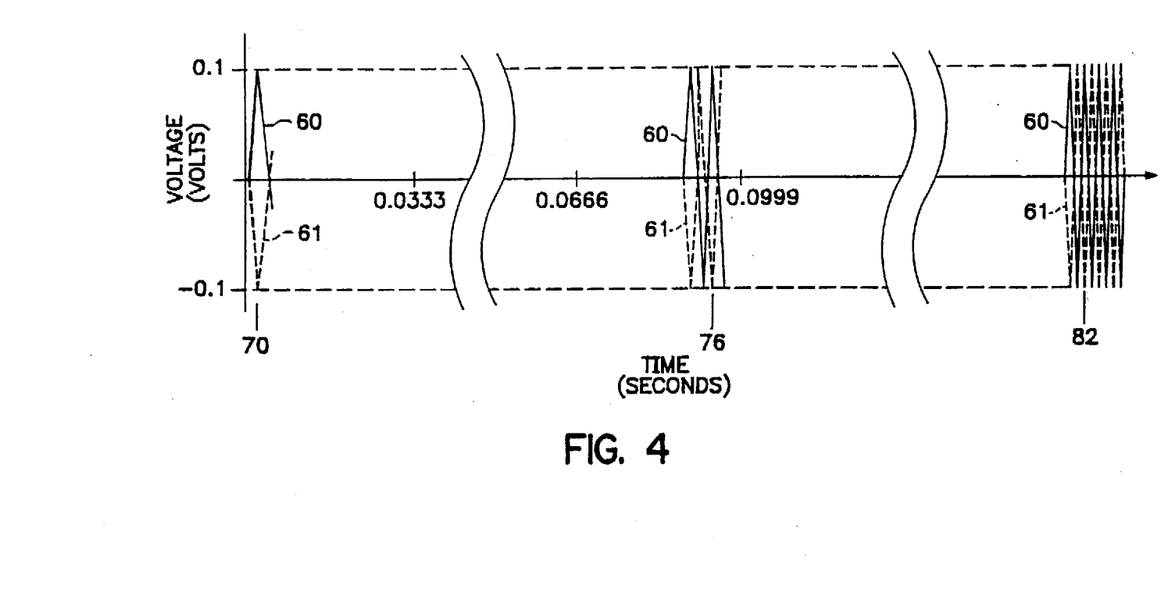
FIGS. 4–7 are graphs of output signals of the power supply from a variable frequency oscillator, a triangular waveform oscillator and a waveform integrator.
Figure 6:
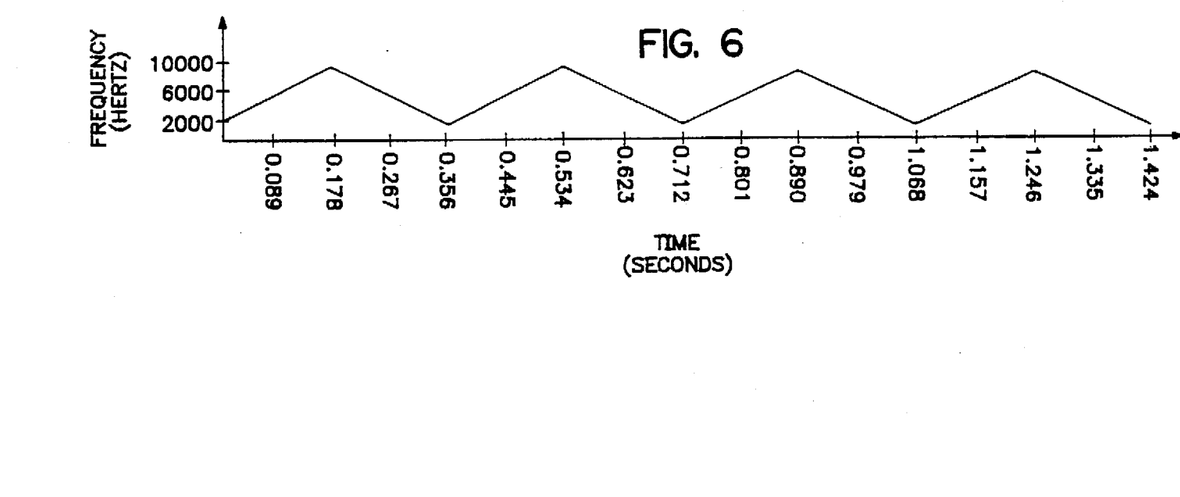

As shown in FIGS. 4 and 6, frequency signals 60 and 61 are composed of continuous triangular waveforms that oscillator 50 continuously varies in frequency from 2 kHz to 10 kHz and back to 2 kHz every 0.356 seconds or at a frequency of about 2.8 cycles per second. Signal 61 leads signal 60 by ½ cycle so that signal 61 appears as an inversion of signal 60. FIG. 4 illustrates both signals 60 and 61. FIG. 6 illustrates the linear repetitive change in frequency.

Figure 5:
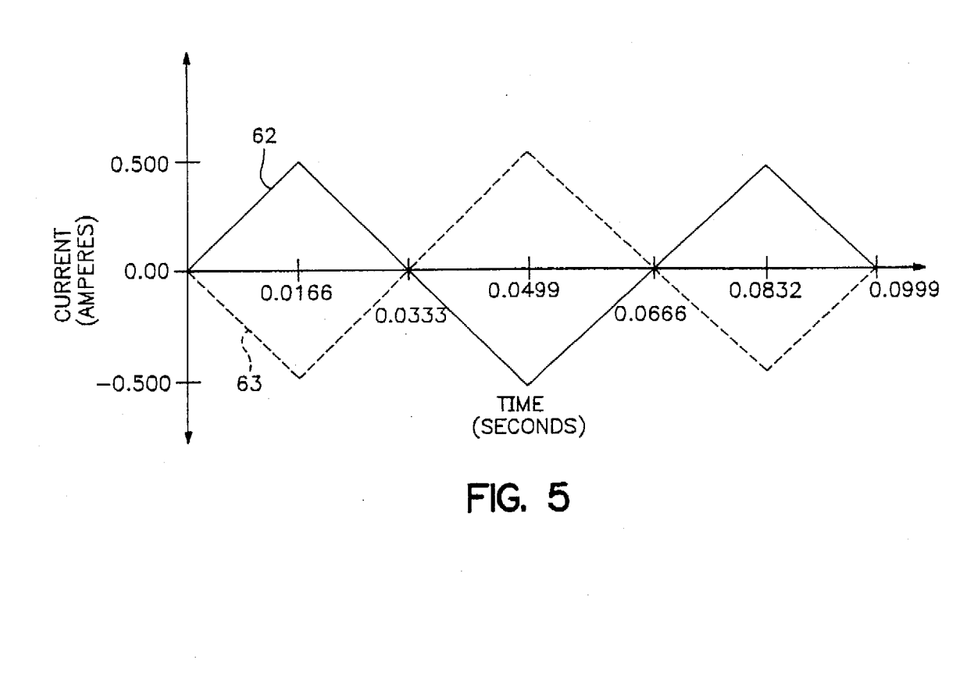

As shown in FIG. 5, amplitude signals 62 and 63 are composed of triangular waveforms with a frequency of 15 Hz and a peak amplitude of ±500 mA. The signals have linear slopes. Signal 63 leads signal 62 by ½ cycle so that signal 63 appears as an inversion of signal 56.

Figure 7:
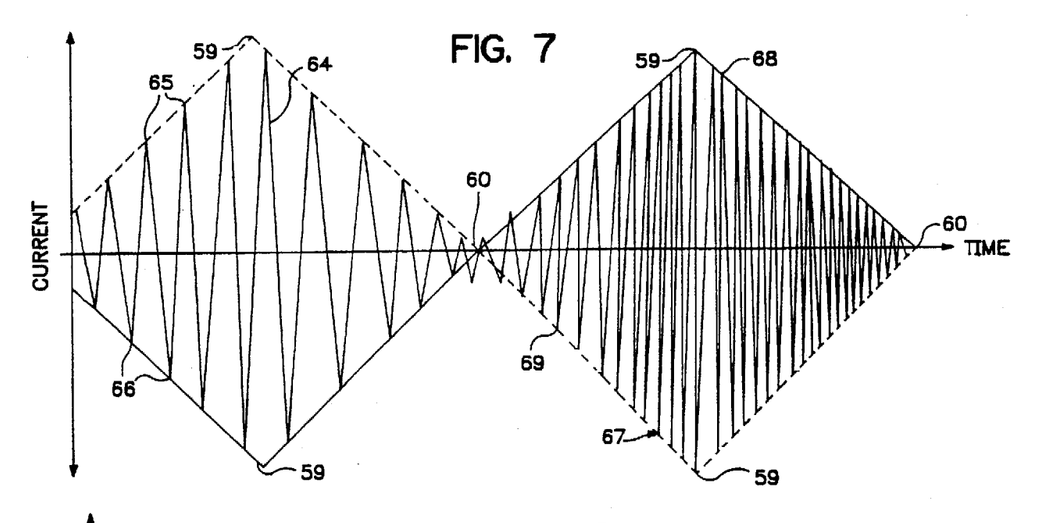

As shown in FIG. 7, the current output signal 64 of waveform integrator 48 varies in frequency and amplitude with the positive and negative amplitude peaks 65, 66 generally lying on an envelope 67 defined by two interacting triangular waveforms 68 and 69, which are inversions of each other. Waves 68 and 69 have the shape of signals 62 and 63 shown in FIG. 5.

The output signal 64 continuously varies in frequency according to signals 60 and 61. Output signal 64 is a complex waveform that varies in frequency in step with the frequency change of signals 60 and 61 and varies in peak amplitude in step with the amplitude change of signals 62 and 63. The waveform of output signal 64 is a generally triangular wave with steep linear slopes extending up to a positive peak amplitude 65 and then steep linear slopes extending down to a negative peak amplitude 66. The value of the peak amplitudes 65 and 66 vary with time and are defined by envelope 67. The value of the slope is constantly changing due to the constantly changing peak amplitude and frequency during the rise and fall of the signal. FIG. 7 is a representation of output 58 showing the change in frequency and amplitude. Because the frequency and amplitude are continuously changing, the sides of the individual waves may be slightly bowed up or down between peaks. FIG. 7 shows straight wave sides for convenience.

Alternatively, signals 60–63 may be truncated triangular waveforms and output signal 64 may be a truncated triangular waveform continuously varying in frequency according to signals 60 and 61 with a varying peak amplitude defined by signals 62 and 63. The output signal 64 would have a steep linear slope to the positive or negative peak amplitude and then have a slope of zero for a period of time before rising or falling to the next peak amplitude.

Signals 60 and 61 may be varied in frequency from 1 Hz to 1 MHz. Test results have shown the optimum results are obtained when signals 60 and 61 (and thus output signal 64) vary between 2 kHz and 10 kHz. Signals 62 and 63 may be varied between 50 mA and 200 A. Large commercial applications generally produce best results when the output signal is varied between 50 mA and 10 A while residential applications yield optimum results when varied between 50 mA and 500 mA. Amplitudes of 200 A have been used effectively on commercial applications.

Coil 14 is preferably wound from insulated number fourteen AWG wire and connectors 22,24 and 32,34 are preferably conventional banana plug connectors. Connectors 22 and 24 are preferably crimped on the ends of coil 14 and connectors 32 and 34 are preferably fastened to power supply 16.

Figure 2:
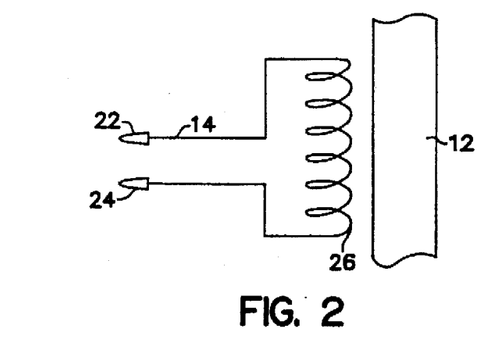
FIG. 2 is a view of an electromagnetic coil adjacent a water conduit.

As shown in FIG. 2, coil loops 26 may be located adjacent conduit 12 as opposed to around the conduit. Loops 26 must be located within a distance to conduit 12 such that the field produced by device 10 intersects water flowing in conduit 12.

Coil 14 is wound around water conduit 12 in helical loops 26. For each 0.25 inches of diameter of non-ferris conduit 12, five loops 26 are formed in coil 14. If conduit 12 is of a ferris material, an additional 1.25 loops are formed for every 0.25 inches of diameter.

After winding coil 14 on conduit 12, connectors 22 and 24 are inserted into connectors 32 and 34, respectively. Plug 28 is inserted into source 18 energizing circuit 30.

Frequency oscillator 50, powered by signal 46, generates frequency output signals 60 and 61. As shown in FIG. 4, signals 60 and 61 are two triangular waveforms which continuously vary in frequency from 2,000 to 10,000 Hz. By varying the frequency between a minimum and maximum, device 10 can effectively treat the water without regard to nearby electromagnetic sources that might otherwise interfere with and cancel out the generated field. Varying the frequency of the signal output also varies the strength and speed at which the fields change direction which improves the effectiveness of descaling.

FIG. 4 shows signals 60 and 61 with respect to a time axis and voltage axis. At point 70, the time is 0 seconds and signals 60 and 61 have a frequency of 2000 Hz. Signal 60 rises to a peak voltage of 0.1 volts while signal 55 falls to a peak voltage of −0.1 volts. Once the signals reach the peak voltages, signal falls to voltage −0.1 volts while signal 55 rises to voltage 0.1 volts. At point 76, the time is 0.089 seconds and signals 54 and 55 are at a frequency of 6000 Hz. At point 82, the time is 0.178 seconds and signals 54 and 55 are at a frequency of 10000 Hz.

Waveform oscillator 52 generates amplitude output signals 62 and 63. As shown in FIG. 5, signals 62 and 63 are two triangular waveforms that form a diamond shaped wave and continuously vary in peak amplitude from 0 mA to 500 mA back to 0 mA in one cycle with a frequency of 30 cycles per second.

By using signals 62 and 63 to vary the amplitude of the FIG. 7 output signal between a minimum and maximum, device 10 can effectively treats a variety of molecules in the water. Different size molecules react differently to various field strengths. Varying the amplitude of the signal output varies the strength of the field which improves the effectiveness of the descaling operation allowing treatment of a variety of impurities.

FIG. 5 shows signals 62 and 63 with respect to a time axis and current axis. At 0 seconds, signals 62 and 63 have a amplitude of 0 mA. Signal 62 rises to a peak amplitude of 500 mA while signal 63 falls to a peak amplitude of −500 mA. Signals 62 and 63 reach amplitudes ±500 mA at 0.0166 seconds. Signal 62 falls towards amplitude −500 mA while signal 63 rises to amplitude 500 mA. Both signals reach amplitude 0 mA at point 72 where time is 0.0333 seconds. At 0.04999 seconds and signal 62 is at amplitude −500 mA while signal 63 is at amplitude 500 mA.

Waveform integrator 48, powered by signal 46, integrates signals 60–63 generating circuit output signal 64. As shown in FIG. 7, output signal 64 is a complex triangular waveform signal continuously varying in frequency from 2,000 Hz to 10,000 Hz back to 2,000 Hz and peak amplitude from 50 mA to ±500 mA back to 50 mA.

Output current signal 64 is applied across ends of coil 14 causing a time varying current to flow in loops 26. The time varying current causes loops 26 to act as a solenoid and generate a magnetic field. The magnetic field is described by Ampere's law with the right hand rule determining the direction of the field and the strength of the field defined by $$B = \mu_0 n I$$

where
B=magnetic field vector
$\mu_0$=permeability of empty space
n=number of coils 26
I=current vector As indicated by the formula above, the strength of the magnetic field varies with time when the current varies with time. The time varying magnetic field induces a current inside the conduit 12 and a resultant electric field. The electric field is described by Faraday's law of induction with the strength of the field defined by $$\int E \cdot ds = -\partial/\partial t \int B \cdot dA$$

where
E=induced electric field vector
B=magnetic field vector
A=induced current vector The magnetic and electric fields produced by output signal 64 permeate conduit 12 and interact with the water flowing in conduit 12. Calcium and bicarbonate molecule each contain a charge q. When the molecules with charge q move through the electric and magnetic fields, the molecules experience a force vector. The force vector is a result of the Lorentz force described by $$F = qE + q(V \times B)$$

where
F=Lorentz force vector
q=charge on the molecule
E=induced electric field vector
V=molecule velocity vector
B=magnetic field vector Because the induced current changes magnitude and direction when the output signal 58 varies in frequency and amplitude, the calcium and bicarbonate molecules experience mechanical agitation when passing through the field. The mechanical agitation causes nucleation of the calcium and bicarbonate ions and formation of calcium carbonate crystals. The newly formed crystals are electrically neutral and do not adhere to conduit 12. In addition, the water molecules are attracted to calcium-hydrogen carbonate scales already adhered as they flow along conduit 12. The water molecules then bond with calcium-hydrogen carbonate scale returning the scale to solution in the water and forming calcium and bicarbonate ions. When the ions pass through the field, neutral calcium carbonate scales are formed as described above.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A device for treating water flowing in a conduit to neutralize and prevent the formation of calcium carbonate scale in the water, the device comprising;
   A) field transmitting coil adapted to be located adjacent to a water conduit, said coil having two input terminals; and
   B) a waveform generator connected to said coil terminals, said generator generating a triangular wave current output signal at said terminals, said signal having a peak to peak amplitude and a frequency.

2. The device as claimed in claim 1 wherein said generator includes frequency varying means for varying the frequency of said signal between a minimum frequency and a maximum frequency.

3. The device as claimed in claim 2 wherein said frequency varying means varies the frequency between a minimum frequency of approximately 2,000 hertz and a maximum frequency of approximately 10,000 hertz.

4. The device as claimed in claim 2 wherein said generator includes amplitude varying means for varying the peak to peak amplitude of said current signal between a minimum peak to peak amplitude and a maximum peak to peak amplitude.

5. The device as claimed in claim 4 wherein said amplitude varying means varies the amplitude between a minimum amplitude of approximately 0.1 amperes and a maximum amplitude of approximately 400 amperes.

6. The device as claimed in claim 4 wherein said frequency varying means continuously varies the frequency of said current signal from the minimum frequency to the maximum frequency and back to the minimum frequency in approximately 0.356 seconds.

7. The device as claimed in claim 4 wherein said amplitude varying means varies the signal amplitude from the minimum amplitude to the maximum amplitude and back to the minimum amplitude in approximately 0.0333 seconds. amplitude of the signal from approximately 01. Amperes to 20 amperes and back to 0.1 amperes in 0.3333 seconds.

8. A method of treating a water using an electromagnetic coil and a waveform circuit, comprising the steps of:
   A) generating a triangular wave current signal having a linear slope portion joining a peak;
   B) applying the current signal to the coil to generate a magnetic and electric field; and
   C) positioning the coil adjacent the water so that the magnetic and electric field intersects the water.

9. The method as claimed in claim 8 including the step of:

D) continuously varying the frequency of the signal from approximately 2,000 hertz and to approximately 10,000 hertz.

10. The method as claimed in claim 9 including the step of:

E) continuously varying the peak to peak amplitude of the signal.

11. The method as claimed in claim 10 wherein step E) includes the step of continuously varying the peak to peak amplitude of the signal from approximately 0.1 amperes to approximately 20 amperes and back to approximately 0.1 amperes in approximately 0.3333 seconds.

12. A device for treating water flowing in a conduit to neutralize and prevent formation of calcium carbonate scales in the water, comprising;

A) an electric coil wound in a coil adjacent the conduit; and

B) a waveform circuit connected to ends of said coil and having a truncated triangular wave current output signal, said signal coupled to said coil and having a peak to peak amplitude and a frequency.

13. The device as claimed in claim 12 wherein said circuit includes frequency varying means for varying the frequency of said signal between a minimum frequency and a maximum frequency.

14. The device as claimed in claim 13 wherein said frequency varying means for varies frequency between a minimum frequency of approximately 2,000 hertz and a maximum frequency of approximately 10,000 hertz.

15. The device as claimed in claim 13 wherein said circuit includes amplitude varying means for varying the peak to peak amplitude of said signal between a minimum peak to peak amplitude and a maximum peak to peak amplitude.

16. The device as claimed in claim 15 wherein said amplitude varying means varies the amplitude between a minimum amplitude of approximately 0.1 amperes and a maximum amplitude of approximately 20 amperes.

17. The device as claimed in claim 15 wherein said frequency varying means varies the frequency of the signal from a minimum frequency to a maximum frequency and back to the minimum frequency in approximately 0.3558 seconds.

18. The device as claimed in claim 15 wherein said amplitude varying means varies the amplitude continously from a minimum amplitude to a maximum amplitude and back to the minimum amplitude in approximately 0.0333 seconds.

* * * * *

UNITED STATES PATENT AND TRADEMARK OFFICE
CERTIFICATE OF CORRECTION

PATENT NO. : 5,738,766
DATED : April 14, 1998
INVENTOR(S) : George N. Jefferson

It is certified that error appears in the above-indentified patent and that said Letters Patent is hereby corrected as shown below:

Column 1, line 49, following "Conventional" delete 'of'.
Column 3, line 12, following "and" insert --34--; line 27, change "70" to --72--.
Column 5, line 60, change "Loreritz" to --Lorentz--.
Claim 7, delete lines 5-7 in their entirety.
Claim 14, line 2, following "means" delete 'for' and following "varies" insert --the--.
Claim 18, line 2, change "continously" to --continuously--.
Sheet 2, Figure 3, change reference numeral "70" to reference numeral --72--.

Signed and Sealed this

Seventh Day of July, 1998

Attest:

Attesting Officer

BRUCE LEHMAN

*Commissioner of Patents and Trademarks*